United States Patent [19]
Molnar et al.

[11] Patent Number: 6,084,929
[45] Date of Patent: Jul. 4, 2000

[54] METHOD AND APPARATUS FOR CHANNEL TRACKING

[75] Inventors: Karl Molnar; Greg Bottomley; Rajaram Ramesh, all of Cary, N.C.

[73] Assignee: Ericsson Inc., Research Triangle Park, N.C.

[21] Appl. No.: 09/007,936

[22] Filed: Jan. 16, 1998

Related U.S. Application Data

[63] Continuation-in-part of application No. 08/766,167, Dec. 12, 1996, Pat. No. 5,889,827.
[51] Int. Cl.[7] ............................................. H04B 1/10
[52] U.S. Cl. .................... 375/350; 375/229; 375/232; 375/233; 375/347
[58] Field of Search .................. 375/350, 346, 375/347, 341, 229, 232, 233

[56] References Cited

U.S. PATENT DOCUMENTS

| | | | |
|---|---|---|---|
| 5,263,053 | 11/1993 | Wan et al. | |
| 5,488,638 | 1/1996 | Kazecki et al. | 375/347 |
| 5,621,769 | 4/1997 | Wan et al. | 375/347 |
| 5,774,504 | 6/1998 | Huszar et al. | 375/341 |
| 5,790,598 | 8/1998 | Moreland et al. | 345/233 |
| 5,862,192 | 1/1999 | Huszar et al. | 375/347 |
| 5,937,014 | 8/1999 | Pelin et al. | 375/340 |

FOREIGN PATENT DOCUMENTS

PCT/US99/00929  6/1999  WIPO.

OTHER PUBLICATIONS

Z. Ding et al., "Knowledge Based Identification of Fractionally Sampled Channels", Proceedings of the International Conference on Acoustics, Speech adn Signal Processing (ICASSP), Detroit, May 12, 1995, Statistical Signal and Array Processing, vol. 3, No. CONF. 20, May 9, 1995, pp. 1996–1999, XP000533091, IEEE.

W. C. Wong et al. "Multipath Fading Models and Adaptive Equalizers in Microwave Digital Radio", *IEEE Transactions on Communications*, vol. 32, No. 8, Aug. 1984, pp. 928–934, XP002104364, New York.

S. V. Shell et al. "Improved Performance of Blind Equalization Using Prior Knowledge of Transmitter Filter", Proceedings of the Military Communications Conference (MILCOM), Long Branch, NJ, Oct. 2–5, 1994, vol. 1, Oct. 2, 1994, pp. 128–132, XP000505873, IEEE.

P. Newson et al., "Model Based Adaptive Channel Identification Algorithms for Digital Mobile Radio", Serving Humanity Through Communications, SUPERCOM/ICC, New Orleans, May 1–5, 1994, vol. 3, May 1, 1994, pp. 1531–1535, XP000438752, IEEE.

G. M. Vachula and F. S. Hill, Jr.; *On Optimal Detection of Band–Limited PAM Signals with Excess Bandwidth*; Concise Papers, 1981 IEEE.

*Primary Examiner*—Stephen Chin
*Assistant Examiner*—Mohammad Ghayour
*Attorney, Agent, or Firm*—Jenkens & Gilchrist, P.C.

[57] ABSTRACT

A method and apparatus for channel tracking is disclosed wherein pulse-shaping information is used to improve channel tracking performance. Information symbol values are prefiltered using the pulse shape information for a received baseband signal to generate a filtered waveform. The filtered waveform provides a reference signal for a medium response estimation. The estimated medium response is used with a coherent detector to detect unknown information symbols within the baseband signal. Medium response estimates can be determined for a single detected symbol sequence or for each hypothesized symbol sequence.

22 Claims, 3 Drawing Sheets

METHOD AND APPARATUS FOR CHANNEL TRACKING

CROSS REFERENCE TO RELATED APPLICATION

This application for patent is a continuation-in-part and hereby incorporates by reference previously filed, U.S. application for patent Ser. No. 08/766,167, filed Dec. 12, 1996, now U.S. Pat. No. 5,889,827 and entitled "Method and Apparatus for Digital Symbol Detection Using Medium Response Estimates" by Gregory E. Bottomley, Karl Molnar and Rajaram Ramesh.

BACKGROUND OF THE INVENTION

1. Technical Field of the Invention

The present invention relates to channel tracking, and more particularly, to an improved method of channel tracking involving only the medium response of a received signal.

2. Description of Related Art

A communication system is formed, at a minimum, of a transmitter and a receiver interconnected by a communication channel. The communication system is operable at least to transmit communication signals, having an informational content, generated at, or applied to, the transmitter upon the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission upon the communication channel, and the receiver operable in the radio communication system is operable to receive the communication signal transmitted upon the communication channel.

Typically, the radio receiver includes tuning circuitry tunable to the frequencies of the communication channel upon which the communication signal is transmitted, down-conversion circuitry for down-converting a receive signal formed of the communication signal from a transmission frequency into a lower frequency, or baseband signal, demodulation and decoder circuitry which permits the informational content of the communication signal to be recreated. A radio communication system is advantageous for the reason that a fixed, or hard-wired, connection is not required to form the communication channel extending between the transmitter and receiver. Communication can be effectuated between remotely-positioned transmitters and receivers without the need to form the hard-wired or other fixed connection therebetween.

Technological advancements in communication technologies have permitted communication systems to utilize digital communication techniques. Some existing communication systems have been converted to permit the utilization of digital communication techniques; other communication systems have been planned, or have been made possible, as a result of such technological advancements. Utilization of digital communication techniques is advantageous as information can be more efficiently transmitted upon a communication channel than by utilizing conventional, analog communication techniques. Also, some transmission difficulties which distort the communication signal as the communication signal is transmitted by a transmitter to a receiver can sometimes be more readily overcome when digital communication techniques are utilized.

A transmitter operable in such a communication system digitizes an information signal to form a digital signal. Once digitized, the digital signal can be modulated by a digital modulation technique, such as by a Gaussian Minimum Shift Keying (GMSK) modulation technique. The digitized signal, once modulated, is transmitted upon a communication channel.

A receiver operable to receive the signal transmitted upon communication channel includes circuitry to demodulate the signal received and to form a digitized signal which can then be converted into another form, if desired, such as by a decoding process.

Distortion is sometimes introduced upon the signal transmitted by the transmitter. The distortion can, for instance, be caused by filter circuitry of the transmitter, or filter circuitry of the receiver, or the communication channel. The filter circuitry of the transmitter, the communication channel, and the filter circuitry of the receiver shall, at times, be together referred to as the "composite channel" below.

One type of distortion which is sometimes introduced on the signal is referred to as intersymbol interference. The causes of intersymbol interference and the distortion caused therefrom is well-known.

Receivers operable to receive signals in a digital communication system sometimes include circuitry, referred to as channel estimator circuitry, which estimates the channel characteristics, namely, the channel impulse response, of the composite channel. Such channel estimators generate an estimate of a channel impulse response of the composite channel. The channel impulse response estimated by the channel estimator is used by receiver equalizer circuitry to counteract the intersymbol interference, thereby to permit the receiver to recreate more accurately the informational content of the communication signal actually formed at the transmitter.

The quality of the channel estimate is important since an accurate estimation of the channel impulse response is determinative of the ability of the receiver equalizer to counteract for intersymbol interference. The incorporation of channel tracking within an equalizer has been used when the tracked channels vary fast enough over the duration of the data being equalized. This approach is used in a D-AMPS equalizer at both the base station and the mobile station. Most existing channel tracking systems track the overall response of a channel, which consists of the medium response plus the fixed filter response. Existing systems also normally utilize symbol space sampling for processing the received signal.

SUMMARY OF THE INVENTION

The present invention overcomes the foregoing and other problems with an improved method for channel tracking. A received data sequence is filtered and fractionally sampled using a sample period less than the symbol rate of the symbol sequence. The symbol sequence is processed by a channel tracking apparatus that tracks the medium response of the fading, dispersive channel in response to the received data sequence, a hypothesized transmitted symbol sequence and the composite pulse-shape transmit and receive filter.

This tracking mechanism may be implemented in a number of embodiments. In a first embodiment, a single channel tracking model is used for each Viterbi state of a Viterbi algorithm. In another embodiment, only one channel tracking model is used for all Viterbi states. The channel tracking apparatus calculates the medium response by initially determining a modified symbol vector in response to the hypothesized transmitted symbol sequence and the pulse-shape of the transmit and receive filter. The modified symbol vector, a previous estimate of medium response, and the received data sequence are used to calculate a present medium state estimate. An estimate of the next medium state is achieved by predicting the next medium state from the present medium state. The predicted next medium state is used to estimate the medium response. The present medium state is stored in memory to be later used as the previous medium state.

A channel tracking model operating according to a single channel model operates in much the same fashion, except tracking the medium state involves the use of a best hypothesized received symbol sequence rather than a hypothesized sequence for each Viterbi state. Utilizing this information an estimate of the received signal is determined and the present medium state determined based upon the estimate of the received data sequence, a composite filter pulse shape and the actual filtered, received data sequence. The present medium state is used to predict a next medium state from which the medium response may be estimated. The medium taps for the present medium state and the next predicted medium state are then calculated from the estimated medium response.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
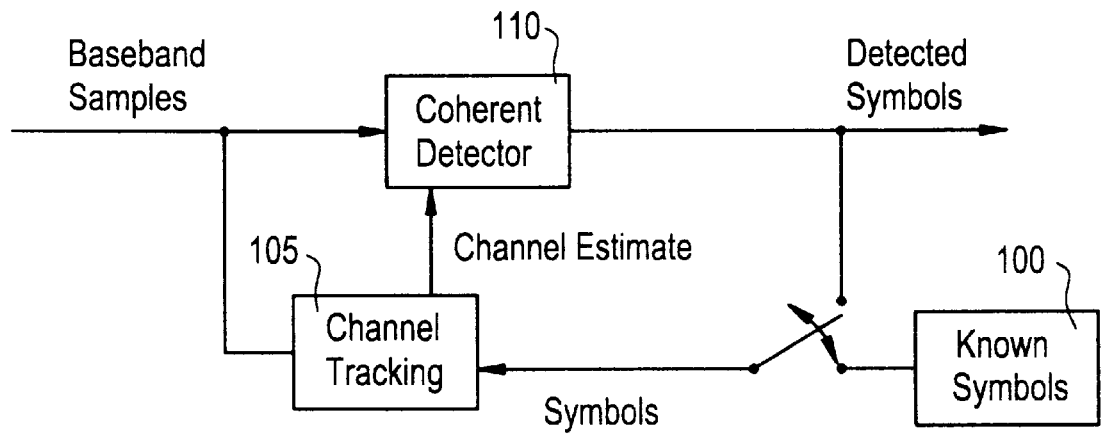
FIG. 1 is a block diagram of a coherent detector.

A set of transmitted symbols may be defined as $\underline{s}=[S_0, S_1, \ldots, S_{L-1}]$. The received signal containing the set of transmitted symbols at $N_a$ antennas comprises a vector of the form $$\underline{r}(t)=\underline{s}(t;\underline{s})+\underline{n}(t) \quad (1)$$

where $$\underline{s}(t;\underline{s}) = \sum_{l=0}^{L-1} s_l \underline{h}(t, lT) \quad (2)$$

r(t) is the received signal, n(t) is the additive white guassian noise and T is the symbol period.

The channel response will be composed of two components, namely the propagation channel response and the fixed transmit filter response. The composite channel response h(t,lT) is assumed to have the form $$h(t, lT) = \sum_{k=0}^{K-1} f(t - (k + lM)T_s)\underline{g_k}(t). \quad (3)$$

Where: $f(t)$ = transmit filter; and $\underline{g_k}(t)$ = fading for delay $kT_s$.

The above equation allows for the fractional sampling rate ($T_s$) to be a fraction of the symbol period T, corresponding to $T=MT_s$.

In a prior art coherent detector, a received signal $\underline{r}(t)$ is passed through a matched filter f*(−t) to generate the output signal $\underline{y}(t)$.

$$\underline{y}(t) = f^*(-t) * \underline{r}(t) \quad (4)$$

$$= \int_{-\infty}^{\infty} f^*(\alpha - t)\underline{r}(\alpha)d\alpha$$

If the transmit and receive filters together provide a Nyquist response and timing is ideal, then the sampling rate at lT provides the response $$\underline{y}(lT) = \sum_{k=0}^{K-1} s_{l-k}\underline{g_k}(lT) \quad (5)$$

where:

$$\underline{g}(lT)=\underline{h}(lT;kT) \quad (6)$$

If there were only non zero channel taps at k=0, then $$\underline{y}(lT)=s_l\underline{g_0}(lT) \quad (7)$$

In order to detect the transmitted set of symbols $s_l$ coherently, $g_o(lT)$ must be estimated. Known symbols 100 (i.e., sync symbols) are used to estimate $g_o(lT)$ for those l's wherein $S_l$ is known. Channel tracking 105 is used to estimate $g_o(lT)$ where $s_l$ must be detected at a coherent detector 110. This is illustrated more fully in FIG. 1.

When signal dispersion is present, there are more than one set of non-zero channel taps. For a symbol-spaced receiver using Nyquist pulse-shaping and ideal timing, the receiver data passed through a receiver filter is in the same form as that illustrated by equation (5). However, a MLSE equalizer is used rather than a simple coherent detector. A maximum likelihood sequence estimator equalizer is derived by determining the symbol sequence that minimizes the log likelihood metric $$l(\underline{s}; r(t)) = \sum_{l=o}^{L-l}\left[2\text{Re}\{s_l^* r_l\} - \sum_{m=o}^{L-l} s_l^* h_{l,m} s_m\right] \quad (8)$$

$$= \sum_{l=o}^{L-l}\left[2\text{Re}\{s_l^* r_l\} - |s_l|^2 h_{l,l} - 2\sum_{n=1}^{L-1} s_l^* h_{l,l-n} s_{l-n}\right].$$

Equation (8) is said to be expressed in the Ungerboeck form wherein $$r(l) = \sum_{k=o}^{K-1} g_k^H((k+l)T)y((k+l)T) \quad (9)$$

and $$h_{l,m} = \sum_{k=o}^{K-1}\sum_{j=o}^{K-1} g_{k,k+l}^H g_{k+l-m,k+l} \quad (10)$$

$$= \sum_{k=o}^{K-1}\sum_{j=o}^{K-1} g_k^H((k+l)T)g_{k+l-m}((k+l)T)$$

Another form used in a symbol-spaced MLSE equalizer is the direct form, wherein the metric is given by:

$$l(s; r(t)) = \sum_{l=o}^{L-1} [|\underline{y}(lT) - \hat{\underline{y}}(lT)|^2] \quad (11)$$

where $\underline{y}(lT)$ is the received data filtered by the matched filter and sampled at the symbol rate T.

In either of the forms of either equation 10 or equation 11, the terms within the brackets represent the branch metric use as part of the MLSE (i.e., as part of the Viterbi algorithm).

In one method, the received signal y(t) is sampled at times $(k+lM)T_s$, where M is the oversample rate and k=o, 1, 2, . . . , M−1. This set of oversampled data can be treated as M symbol-spaced sequences analogous to having M times N antennas (in the original case there were N antennas). This improves performance but does not take into account the pulse-shape of the transmitted signal. In order to take advantage of the fractional sampling with the known pulse-shape of the transmitted signal, the Ungerboeck form of the equation is used wherein $$r_l = \sum_{k=o}^{K-1} g_k^H((k+lM)T_s)y((k+lM)T_s) \quad (12)$$

and $$h_{l,m} = \sum_{k=o}^{K-1}\sum_{j=o}^{K-1} g_{k,k+lM} \underline{g}_{j,j+mM} P_{(k-j)+(l-m)M} \quad (13)$$

where $g_k(lT)$ equals $g_{k,l}$ notation is used and $$P_{(k-j)+(l-m)M} = \int_{-\infty}^{\infty} f(t-(k+lm)T_s)f(t-(j+mM)T_s)dt. \quad (14)$$

P represents the known pulse-shape which is the convolution of the transmit filter and the receive filter.

$$P(t)=f^*(t)*f(t). \quad (15)$$

Different transmit and receive filters could be utilized such that $$P=f^*_1(t)*f_2(t). \quad (16)$$

This case is also used when symbol sequence equalization is used and the filters are known and not Nyquist.

In an MLSE equalizer described above, an assumption is made that the channel is either known or estimated. The channel can be estimated over the known synchronization symbols, and if the channel does not change over a particular slot, these estimates can be fixed.

Figure 2:
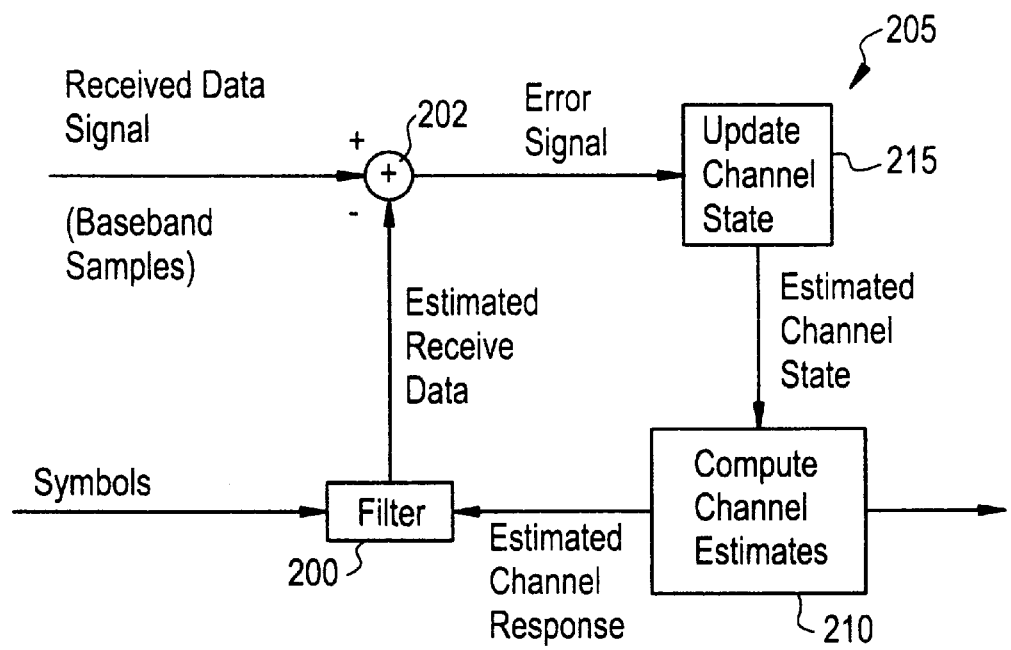
FIG. 2 is a high level block diagram of a prior art channel tracking method.

A high level block diagram of a prior art channel tracking method is illustrated in FIG. 2. The received data or baseband samples are provided to adder 202. The previously estimated channel response is used in conjunction with the hypothesized symbols to estimate the received data using filter 200. These two signals are subtracted in adder 202 to form an error signal which is used to update the channel state at 215. The updated (newly estimated) channel state is used to compute a new updated channel response at 210. The channel state is the state space of parameters that are used to represent the channel. The state may include the channel coefficients and derivatives of channel coefficients. Alternatively, the state may comprise some other parameter/information from which the channel coefficients can be derived.

Figure 3:
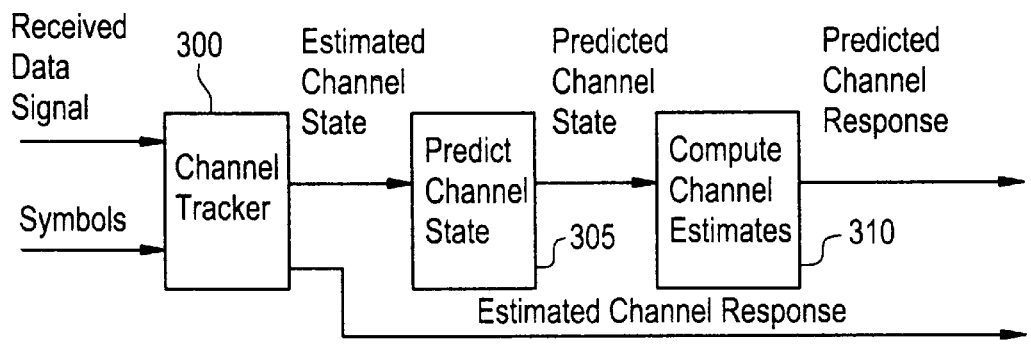
FIG. 3 is a functional block diagram illustrating computation of the predicted composite channel response.

FIG. 3 illustrates how the output of the channel tracker is modified for use with the MLSE. The output of the channel tracker 300 is the estimated channel response generated at 210 of FIG. 2. Hypothesized symbol values are used in the MLSE, but occur at a time later than the time the channel state was updated, so the channel state is predicted at 305 in order to compute the necessary predicted channel response at 310. If, in the MLSE, there is one channel model per state in the Viterbi algorithm, one channel tracker is used for each Viterbi state. An alternative embodiment involves having one tracker for all Viterbi states. This may introduce a delay between the channel state estimate and the MLSE state estimate. An additional embodiment might include multiple channel trackers per Viterbi state, wherein each tracker accounts for a different incoming path.

Figure 4:
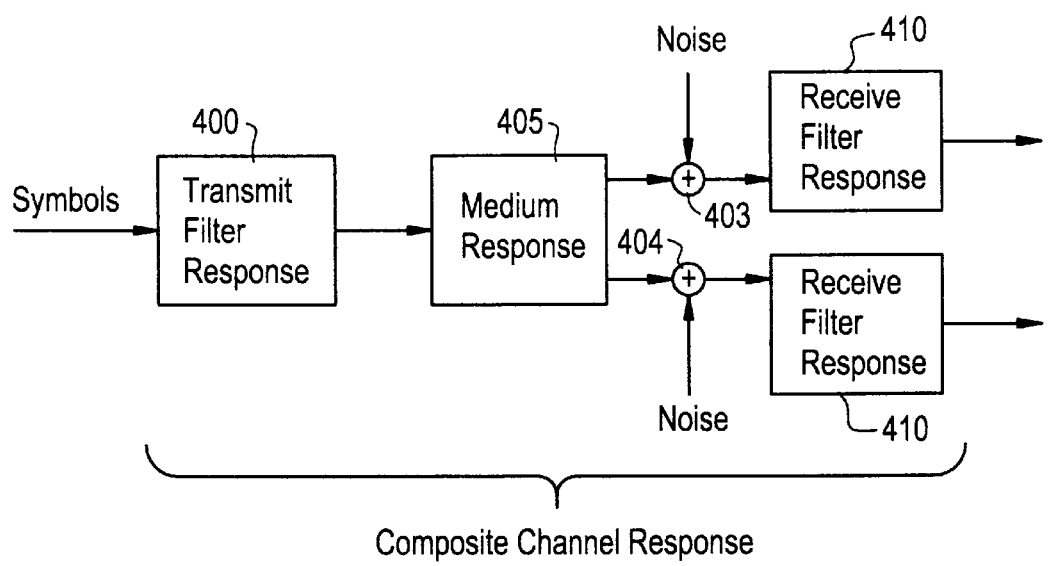
FIG. 4 is a block diagram of a composite channel response.

FIG. 4 illustrates a block diagram of the composite channel response for a sequence of received signals. The transmit filter response 400 and transmission medium response 405 comprise a time varying channel h(t,lT). Sampling the received signal when the transmit and receive filters together are Nyquist(assuming we sample at the true sample point and the medium response 405 has symbol-spaced echos), the contribution of the transmit and receive filters cancel perfectly. Thus, there is no inter-symbol interference generated by the filters, only the medium response. This is not true when the medium includes echos that are not symbol aligned, the transmit/receive filter combination is not Nyquist, or when sampling at fractionally-spaced samples even when the filters are Nyquist.

Figure 5:
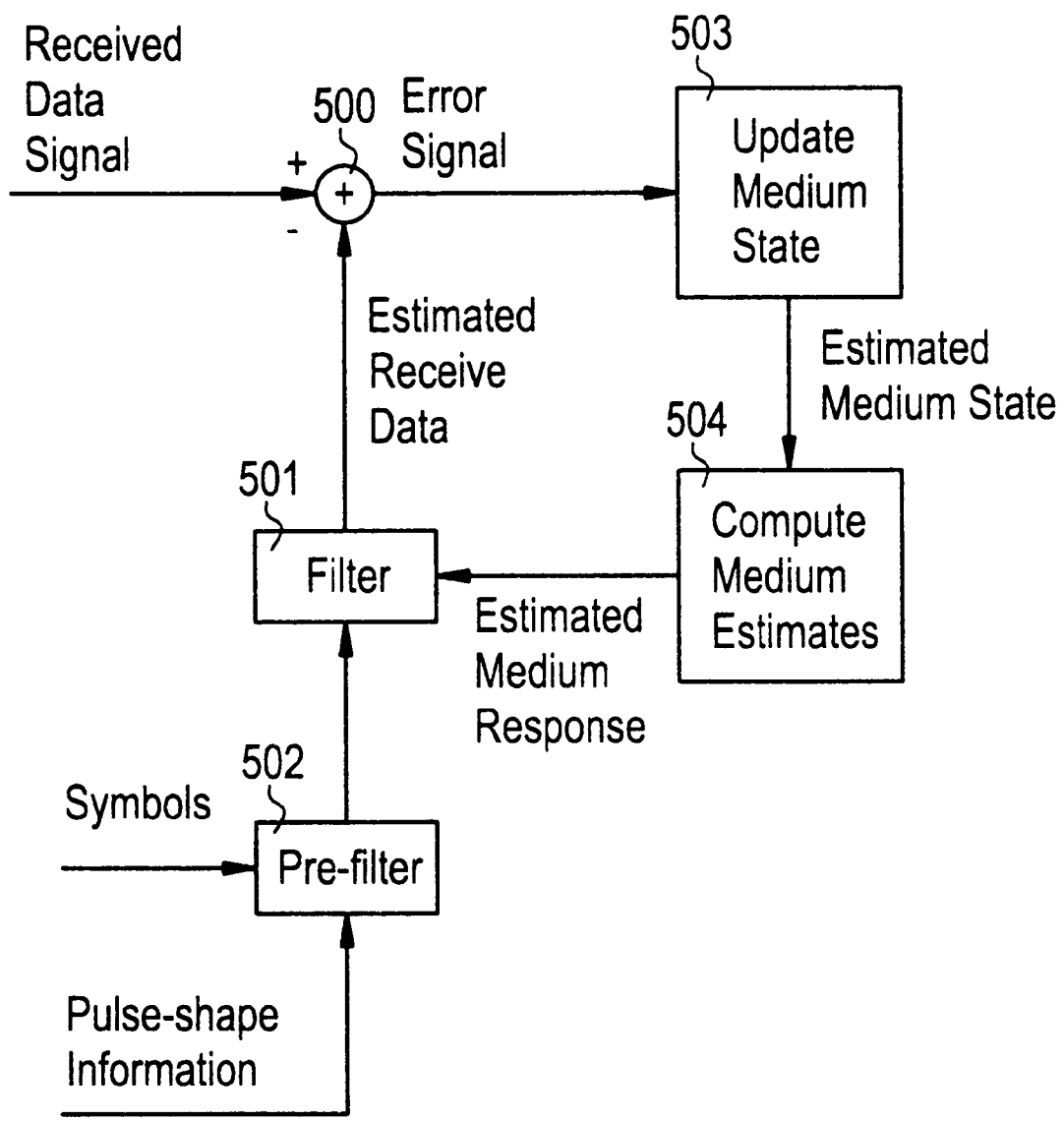
FIG. 5 is a block diagram medium tracking using pulse shape information.

The contribution of the transmit/receive filter can be taken advantage of to estimate and track the channel medium response. A block diagram of this is illustrated in FIG. 5. The symbols (known or hypothesized) are prefiltered at 502 in response to the assumed known pulse-shape information. The prefiltered signal is again filtered at 501 with the estimated medium response to estimate the received data. The remaining portions of the channel tracker are similar to the tracker described previously with respect to FIG. 2, but now the channel state represents the medium response, not the composite response $\underline{h}(t,lT)$. This assumes that the medium response is aligned with the fractional sampling rate or that an equivalent medium response at this rate can be generated.

As an example, in the case where n and j are restricted to n∈{0, 1, . . . , N−1} and j∈{0, 1, . . . , K−1}, then $$\tilde{s}_l[\tilde{s}_l, \tilde{s}_{l-1}, \ldots, \tilde{s}_{l-(N-1)}]^T, \quad (17)$$

$$\Gamma_k = \begin{bmatrix} P_{k-0-0M} & P_{k-0-1M} & \cdots & P_{k-0-(N-1)M} \\ P_{k-1-0M} & P_{k-1-1M} & \cdots & P_{k-1-(N-1)M} \\ \vdots & \vdots & \ddots & \vdots \\ P_{k-(K-1)-0M} & P_{k-(K-1)-1M} & \cdots & P_{k-(K-1)-(N-1)M} \end{bmatrix}_{K \times N} \quad (18)$$

$$g_{k+lM} = [g_{0,k+lM}, g_{1,k+lM}, \ldots, g_{K-1,k+lM}]^T \quad (19)$$

The fractionally filtered signal at time k+lM may be written as, $$y_{k+lM} = [\Gamma_k \tilde{s}_l]^T g_{k+lM}, \quad (20)$$

where $\tilde{s}_l$ is the vector of hypothesized symbols, $\Gamma_k$ is a matrix of pulse-shape responses of the hypothesized symbols at sampling phase (fractional sampling k) and $g_{k+lM}$ is the vector of channel taps for one antenna of the received signal. There will be a different pulse-shape response $\Gamma_k$ for each sampling phase k.

For each sampling phase k, a vector of hypothesized received symbols $\tilde{s}_l$ and the matrix of the pulse-shape responses $\Gamma_k$ are used in pre-filter 502 to compute a modified symbol vector $\underline{b}_{k,l}$. The modified symbol vector $\underline{b}_{k,l}$ is equal to $\underline{b}_{k,l} = \Gamma_k \tilde{s}_l$ (i.e., the pulse shape data multiplied by the hypothesized received symbols). The modified symbol vector $\underline{b}_{k,l}$ and the medium response are utilized at 501 to compute the estimated received signal $\hat{y}_{k+lM}$. The estimated received signal and the actual received signal are combined to generate an error signal which is used to update the medium state $x_{k+lM}$ at 503 in conjunction with a present estimate of the medium state.

The updated medium state $x_{k+lM}$ is used for updating the next medium state at block 503 and for computing the medium response $\hat{g}_{k+lM}$ at 504. The medium response will have K channel taps at spacing $T_s$. The tracked medium response is used by a Viterbi algorithm as part of a MLSE equalization process.

Medium response tracking can be used with other well known equalizers, such as decision feedback equalizers, linear equalizers, and MAP symbol detection.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A channel tracking unit, comprising:
   a first filter for prefiltering a sequence of digital symbol values using pulse-shaping information to produce a filtered symbol signal;
   a second filter for filtering the filtered symbol signal using a medium response estimate to generate an estimated received signal;
   means for generating an error signal from a received baseband signal and the estimated received signal; and
   means for updating the medium response estimate in response to the error signal.

2. The channel tracking unit of claim 1, wherein the digital symbol values comprise detected symbol values.

3. The channel tracking unit of claim 1, wherein the digital symbol values comprise hypothesized symbol values.

4. The channel tracking unit of claim 1, wherein the pulse-shaping information comprises a transmit pulse shape auto-correlation function.

5. A channel tracking unit of claim 1, wherein the pulse-shaping information comprises transmit and receive filter responses.

6. A channel tracking unit of claim 1, wherein the baseband signal comprises symbol-spaced data samples.

7. The channel tracking unit of claim 1, wherein the baseband signal comprises fractionally-spaced data samples.

8. A receiver for demodulating information symbols, comprising:
   a first filter for prefiltering digital symbol values using pulse-shaping information to produce a filtered symbol signal;
   a second filter for filtering the filtered symbol signal in response to a medium response estimate to produce an estimated received signal;
   means for generating an error signal responsive to a received baseband signal and the estimated received signal;
   means for updating the medium response estimate in response to the error signal; and
   a detector for detecting received information symbols using the updated medium response estimate.

9. The receiver of claim 8, wherein the detector for detecting information symbols hypothesizes information symbol sequences and generates metrics from the updated medium response estimate.

10. The receiver of claim 9, wherein the detector updates a plurality of medium response estimates, each medium response estimate corresponding to a different hypothesized information symbol sequence.

11. The receiver of claim 9, wherein the detector further predicts the medium response using the medium response estimate.

12. A method for channel tracking, comprising the steps of:
   receiving a baseband signal and a sequence of digital symbol values;
   prefiltering the received digital symbol values using pulse-shaping information to produce a filtered symbol signal;
   filtering the filtered symbol signal using a medium response estimate to generate an estimated received signal;
   generating an error signal using the received baseband signal and the estimated received signal; and
   updating the medium response estimate using the generated error signal.

13. The method of claim 12, wherein the digital symbol values comprise detected symbol values.

14. The method of claim 12, wherein the digital symbol values comprise hypothesized symbol values.

15. The method of claim 12, wherein the pulse-shaping information comprises a transmit pulse shape autocorrelation function.

16. The method of claim 12, wherein the pulse-shaping information comprises transmit and received filter responses.

17. The method of claim 12, wherein the baseband signal comprises symbol spaced data samples.

18. The method of claim 12, wherein the baseband signal comprises fractionally-spaced data samples.

19. A method for demodulating a sequence of information signals, comprising the steps of:
- receiving a baseband signal;
- prefiltering digital symbol values using pulse-shaping information to generate a filtered symbol signal;
- filtering the filtered symbol signal using a medium response estimate to produce an estimated received signal;
- generating an error signal in response to the received baseband signal and the estimated received signal;
- updating the medium response estimate using the generated error signal; and
- detecting information symbols within the baseband signal using the updated medium response estimate.

20. The method of claim 19, wherein the step of detecting further comprises the steps of:
- hypothesizing an information symbol sequence; and
- generating metrics for the information symbol sequence from the updated medium response estimate.

21. The method of claim 20, wherein the step of updating the medium response estimate further comprises the step of:
- generating a plurality of medium response estimates, each corresponding to a different hypothesized information symbol sequence.

22. The method of claim 19, wherein the step of detecting further includes the step of predicting the medium response using the medium response estimate.

* * * * *

UNITED STATES PATENT AND TRADEMARK OFFICE
CERTIFICATE OF CORRECTION

PATENT NO.     : 6,084,929
DATED          : July 4, 2000
INVENTOR(S)    : Karl Molnar et al.

It is certified that error appears in the above-identified patent and that said Letters Patent is hereby corrected as shown below:

Column 4,
Line 35, replace "$g(lT) = \underline{h}(lT;kT)$" with  $\underline{g_k}(lT) = \underline{h}(lT;kT)$ Column 5,
Line 48, replace "where $g_k$ (lT) equals $g_{k,i}$ notation is used and" with -- where $g_k$ (iT) equals $g_{k,i}$ notation is used and --

Column 7,
Line 4, replace " $\tilde{s}_l [\tilde{s}_l, \tilde{s}_{l-1}, \cdots, \tilde{s}_{l-(N-l)}]^T,$ ", with $$\tilde{s}_l = [\tilde{s}_l, \tilde{s}_{l-1}, \cdots, \tilde{s}_{l-(N-l)}]^T,$$

Signed and Sealed this

Second Day of April, 2002

Attest:

JAMES E. ROGAN
Attesting Officer    Director of the United States Patent and Trademark Office